United States Patent Office 3,324,047
Patented June 6, 1967

3,324,047
CRYSTALLINE ZEOLITE CATALYST
COMPOSITION
Rowland C. Hansford, Yorba Linda, Calif., assignor to Union Oil Company of California, Los Angeles, Calif., a corporation of California
No Drawing. Filed Feb. 11, 1964, Ser. No. 343,932
2 Claims. (Cl. 252—455)

This application is a continuation-in-part of application Ser. No. 150,129, filed Nov. 6, 1961, and now abandoned, which in turn is a continuation-in-part of application Ser. No. 72,325, filed Nov. 29, 1960, and now abandoned.

This invention relates to new methods for the pelleting of certain crystalline, molecular sieve, alumino-silicate zeolite catalysts, to achieve both high catalytic activity and good mechanical strength and stability. The invention also embraces certain novel catalyst compositions resulting from the method. In broad aspect, the pelleting method comprises mixing the powdered zeolite catalyst with a powdered, refractory, relatively inert adjuvant material (to be more specifically described hereinafter), then compressing the mixture into pellets of the desired size and shape while controlling the pelleting pressure so as to form pellets in the bulk density range of about 0.5 to 1.0 gm./ml. A critical aspect of the invention resides in controlling the water content of the zeolite catalyst component during the pelleting operation so as to provide a degree of hydration thereof amounting to at least about 5%, and preferably at least 10%, by weight. It is found also that for obtaining maximum mechanical strength and stability of the pellets, the zeolite catalyst component should comprise a substantial proportion of exchangeable, zeolitic ammonium ions which are later decomposed during final calcining of the pellets to form a corresponding hydrogen zeolite of maximum catalytic activity.

The final catalysts comprise as their essential active component a zeolitic molecular sieve base having active catalytic acidity effective for catalyzing reactions such as hydrocarbon cracking and/or isomerization, and combined therewith a minor proportion of a transitional metal hydrogenating component. More specifically, the molecular sieve base is a hydrogen, or "decationized," form of a certain class of crystalline, zeolitic alumino-characterized by (1) relatively uniform crystal pore diameters of between about 6 and 14 A., preferably 9 to 11 A., and (2) a silica/alumina mole-ratio greater than 3, and preferably between about 4 and 6. The hydrogenating promoter may comprise any one or more of the transitional metals, their oxides or sulfides, and particularly the metals of Group VI-B and Group VIII, and their oxides and sulfides.

It has recently been discovered that the zeolitic molecular sieves of this invention, when converted to a hydrogen form and promoted with a Group VIII metal, constitute catalysts of extremely high intrinsic hydrocracking activity. These new catalysts are in fact from about two to ten times as active, on an equal volume basis, as the more conventional hydrocracking catalysts based on amorphous silica/alumina cogels. This improved activity is believed to arise from the much higher concentration of active acidic cracking centers associated with the crystalline hydrogen zeolites, as compared to the amorphous catalysts.

The zeolite catalysts however suffer from the disadvantages of higher manufacturing costs, and also the greater difficulty involved in preparing pellets of suitable mechanical strength and stability. It has now been discovered, most unexpectedly, that the effective cost of the zeolite catalysts (both on a flat cost-per-pound basis, and on the basis of total cost of a catalyst charge required to effect a given conversion at a given feed throughput rate) can be materially reduced by simply diluting the powdered zeolite catalyst with substantial amounts of the specified, relatively inexpensive adjuvant materials, and copelleting the mixture. The surprising aspect of this discovery is that, on an equal bulk volume basis, the diluted and copelleted catalysts display a hydrocracking activity which is at least equal, and in most cases higher than, the activity of the undiluted zeolite catalyst when in the form of isometric pellets having a bulk density of 0.7 gm./ml. or higher. At the same time, the additional benefit is obtained that, by the specific pelleting methods described herein, the adjuvant functions also as an effective binder, giving pellets of materially improved mechanical stability.

The term "bulk volume activity," as employed herein, is numerically equal to the liquid hourly space velocity required to effect a given conversion at a given feed throughput rate, and under a given set of process conditions. It is thus inversely proportional to the bulk volume of catalyst which is required to effect such a conversion. Those skilled in the art will readily appreciate that an important consideration in hydrocarbon conversion processes is to effect the desired conversion at as high a space velocity as possible, for this reduces reactor size and catalyst inventory to a minimum. Reactor size is an extremely important economic consideration in high-pressure conversion processes such as hydrocracking because of the fabrication costs of the required heavy-walled reactors. For this reason it is generally considered impractical to dilute or otherwie attenuate the active catalyst within the reactor, for this normally results simply in larger reactors. It hence came as a distinct surprise to find that the unique catalysts of this invention could be substantially diluted with the specified adjuvants without the normally ensuing consequences of larger catalyst volumes and reactors to achieve the same feed throughput and conversion.

The theoretical explanation for the observed results obtained herein is not entirely clear. It would appear however that the pure zeolite catalyst, being composed of crystals of about 1 to 5 microns in size, tends to form close-packed structures when compacted into larger granules or pellets. The result is that the exterior surface of the granules presents a relatively impervious barrier to the diffusion of gases, resulting in inefficient utilization of the highly concentrated active centers located in the interior of the pellets. This problem is not generally encountered in the pelleting of conventional amorphous catalysts, or even of other known zeolite catalysts; it appears to be uniquely associated with the hydrogen zeolites of this invention, and is attributable to the three interrelated factors of (1) a crystal form which permits close packing upon compaction, (2) small crystal pores which in themselves provide insufficient access to the core of the pellets, and (3) the unusually large number of active centers per weight unit of the zeolite.

Depending upon the pressure employed in pelleting the undiluted hydrogen zeolite catalyst component, pellets varying in bulk density from about 0.55 to 0.75 gm./ml. can be produced. All of the undiluted catalysts in this bulk density range are found to be "diffusion limited" to some extent, at least in the case of pellets larger than about $\frac{1}{16}''$ in diameter. In the lower bulk density ranges, relatively more of the intercrystalline channels remain open, thus minimizing the problem, but in these cases the mechanical strength of the pellets is so low as to render them of no practical use. In the higher density ranges, from about 0.65 to 0.75, the pellet strength is superior (though still deficient), but in these cases the diffusion limitation problems are most pronounced.

The bulk density figure of 0.7 gm./ml. is taken for purposes of this invention as a reference standard for the pure pelleted zeolite catalysts, representing minimally adequate mechanical stability for commercial utility. Against this reference standard, it has been found that by diluting the zeolite component with the adjuvant materials of this invention, composite catalyst pellets of the same size may be prepared which display equal or superior hardness, and equal or superior activity, on an equal bulk volume basis. This means that, as measured against a pure, pelleted hydrogen zeolite catalyst of 0.7 bulk density (or higher), the catalysts of this invention can be utilized at the same or higher liquid hourly space velocity to achieve the same conversion and feed throughput under the same process conditions, as can be achieved with the pure zeolite catalyst.

The zeolitic molecular sieve catalyst bases employed herein are distinguished principally by their high $SiO_2/Al_2O_3$ mole-ratio, of between about 3.0 and 10. The most active forms are those wherein the exchangeable zeolitic cations are hydrogen and/or a divalent metal such as magnesium, calcium or zinc. In particular, the "Y" molecular sieves, wherein the $SiO_2/Al_2O_3$ ratio is about 4–5, are preferred, either in their hydrogen form, a divalent metal form, or a mixed hydrogen-divalent metal form. Normally, such molecular sieves are prepared first in the sodium form, and most of the monovalent metal is ion-exchanged out with a divalent metal, or where the hydrogen form is desired, with an ammonium salt followed by heating to decompose the zeolitic ammonium ion and leave a hydrogen ion.

Suitable synthetic molecular sieve zeolites for use herein are more particularly described in Belgian Patent No. 598,582, issued Apr. 14, 1961. The preferred zeolite is designated as the "Y" crystal type in said patent, but the "L" crystal type described therein is also contemplated. Natural zeolites such as faujasite, erionite, mordenite and chabazite may also be employed.

In general, the Y zeolite in its sodium form can be prepared by first aging an aqueous sodium alumino-silicate mixture at relatively low temperatures of, e.g., 10–40° C., and then heating the mixture at temperatures between about 40° and 125° C. until crystals are formed, and separating the crystals from the mother liquor. When a colloidal silica sol is employed as the source of silica, the aqueous sodium alumino-silicate mixture may have a composition as follows, expressed in terms of mole-ratios:

$Na_2O/SiO_2$ ------------------------------- 0.2–0.8
$SiO_2/Al_2O_3$ ------------------------------- 10–30
$H_2O/Na_2O$ ------------------------------- 25–60

When sodium silicate is used as the silica source, the optimum molar proportions are as follows:

$Na_2O/SiO_2$ ------------------------------- 0.6–2.0
$SiO_2/Al_2O_3$ ------------------------------- 10–30
$H_2O/Na_2O$ ------------------------------- 30–90

The resulting Y zeolites correspond to the general formula:

$$0.9 \pm 0.2 Na_2O : Al_2O_3 : nSiO_2 : xH_2O$$

where $n$ is a number from 3 to about 6 and $x$ is any number up to about 10.

The "decationized," or hydrogen form of the Y zeolite may be prepared by ion-exchanging the alkali metal cations with ammonium ions, or other easily decomposable cations such as methyl substituted quaternary ammonium ions, and then heating to, e.g., 300°–400° C., to drive off ammonia, as is more particularly described in Belgian Patent No. 598,683. The degree of decationization, or hydrogen exchange, should be at least about 20%, and preferably at least about 40% of the maximum theoretically possible.

Originally, it was thought that a truly "decationized," (i.e., cation-deficient) zeolite was formed upon heating the ammonium zeolite, but the evidence presently available indicates that at least a substantial proportion of zeolitic hydrogen ions remain associated with the ion-exchange sites, and that little or no true "decationization" takes place. It will be understood however, that the term "hydrogen zeolite" as used herein is intended to designate the type of zeolite produced by thermal decomposition of the ammonium zeolite, irrespective of whether some degree of true "decationization" may take place.

Mixed, hydrogen-polyvalent metal forms of the Y zeolite are preferred for most applications. Generally such mixed form are prepared by subjecting the ammonium zeolite to a partial back-exchange with divalent metal salt solutions. The resulting divalent metal-ammonium zeolite may then be heated at, e.g., 400–900° F. to prepare the divalent metal-hydrogen form. Here again, it is preferred that at least about 20% of the monovalent metal cations be replaced with hydrogen ions. It is further preferred that at least about 10% of the monovalent metal cations be replaced by divalent metal ions, e.g., magnesium, calcium, zinc or the like, for this is found to improve the hydrolytic stability of the resulting catalysts. A still further preference to be observed for maximum activity is that not more than about 20% of the original monovalent metal cations (3% by weight of $Na_2O$) shall remain in the catalyst.

Hydrogenation activity is imparted to the zeolitic base by adding a minor proportion, e.g., 0.05–20%, of one or more of the Group VI–B and/or Group VIII metals, preferably a Group VIII noble metal. Specifically, it is preferred to employ about 0.1% to 3% by weight of palladium, platinum, rhodium, ruthenium or iridium. These metals may be added by impregnation of the calcined hydrogen zeolite, but preferably they are added by ion exchange during, or directly after the ammonium ion-exchange step, i.e., before the ammonium zeolite is decomposed to form the hydrogen zeolite.

To incorporate the Group VIII metals by ion exchange, the ammonium zeolite, still in a hydrous form, is digested with an aqueous solution of a suitable compound of the desired metal wherein the metal is present in a cationic form. Preferably, fairly dilute solutions of the Group VIII metal salts are employed, and it can be assumed that there will be a substantially quantitative exchange of ammonium ion for the Group VIII metal.

The refractory adjuvants for use herein may be defined broadly as an inorganic, porous, amorphous or microcrystalline (crystal size below 0.1 micron) powder which (1) is chemically stable at temperatures up to about 1,200° F., (2) is inert with respect to the zeolite catalyst component, (3) has an average pore diameter greater than about 20 A., preferably 50–150 A. (these pore sizes referring to pores in the individual particles, and not the interparticle pores), and (4) contains a substantial proportion of surface hhydroxyl groups, preferably amounting to at least about 0.015 millimole per square meter of surface area (corresponding to about 5 weight-percent water in an adjuvant having a surface area of 200 square meters per gram). Exemplary classes of materials include metal oxides, halides, sulfates, phosphates, silicates, etc. Compounds of monovalent metals, particularly alkali metals, are to be avoided, as are compounds which reduce to volatile metals or catalyst poisons such as $PH_3$ or $MoO_3$. Low melting compounds such as $V_2O_5$, $B_2O_3$, $ZnCl_2$ and the like, which may fuse or flux the zeolitic component, are also to be avoided. Amorphous, noncrystalline materials are preferred, though not essential.

Ordinarily, the adjuvant material is relatively inert (as to hydrocracking activity), as compared to the molecular sieve catalyst, but it is not intended to exclude the use of materials which in themselves exhibit some desirable catalytic activity. Preferably, the adjuvant is ground to a mesh size (Tyler) coarser than about 325, and finer than about 50 mesh. Examples of suitable adjuvants are as follows:

Oxides:
    Alumina (gamma, eta or kappa)
    Silica gel
    Magnesium oxide
    Titanium oxide
    Chromium oxide
    Zinc oxide
    Rare earth oxides
    Beryllium oxide
Phosphates:
    Boron phosphate
    Aluminum phosphate
    Zirconium phosphate
Halides:
    Magnesium hydroxyfluorides
    Aluminum hydroxyfluorides
    Calcium hydroxyfluorides
Sulfates:
    Titanyl sulfate
    Zirconyl sulfate
Silicates:
    Clay (Low $Na_2O$)
    Aluminum silicate
    Magnesium silicate
    Calcium silicate
    Titanium silicate Suitable clay adjuvants for use herein include both the montmorillonite types and the kaolin types, when converted to a hydrogen form substantially free of zeolitic alkaline metals. The hydrogen forms can be prepared either by conventional acid-washing (which also removes some of the alumina), or by ion exchanging an aqueous suspension of the clay with an acid exchange resin such as Amberlite IR–120. The latter procedure produces a hydrogen clay with its natural silica-alumina framework substantially intact.

Silicas for use herein include for example silica gel, and various naturally occurring forms of silica such as diatomaceous earth, kieselguhr, and the like. In using the naturally occurring silicas, it is normally preferable to remove contaminating metals and alkalis by acid-washing. Other amorphous forms of silica may also be employed.

Suitable aluminas for use herein include alumina gel, alumina trihydrate, activated alumina, bauxite, and the like. The preferred adjuvants are coprecipitated alumina-silica gels containing about 3–50% by weight of $SiO_2$. These silica-stabilized alumina gels are found to give pellets of substantially superior mechanical stability, as compared to alumina gel alone.

In one modification of the invention, the powdered adjuvant material may be modified by the incorporation therein of a hydrogenating promoter, which may be the same as or different from the hydrogenating promoter used on the zeolitic component. This modification is particularly desirable in connection with the treatment of high-end-point feedstocks boiling above about 650° F. and up to about 1,000° F.

The optimum proportion of adjuvant material to be employed in the finished catalyst will vary considerably, depending upon the particular zeolite catalyst, the specific adjuvant employed, and the particular feedstock which is to be converted. In general, it may be said that any proportion of the adjuvant will benefit the catalyst to some extent, both in mechanical strength and in efficiency of utilization of the active zeolite component. Optimum proportions generally range between about 10 and 80% by weight of the final catalyst composition, with the preferred range lying between about 20% and 50%. Normally it is desirable to adjust the relative proportions of adjuvant and zeolite so as to provide a final catalyst having an activity, on a bulk volume basis, at least equal to the activity of the zeolite component alone when pelleted to the same size and to a bulk density of 0.7 gm./ml. This proportion will be relatively high, e.g., 40–80%, for highly active zeolite catalyst components wherein 80–100% of the ion-exchange capacity is satisfied by hydrogen ions, and the proportion will be relatively low, e.g., 10–40% by weight, when the zeolite component is relatively less active, as where only about 20–50% of the ion-exchange capacity is satisfied by hydrogen ions. In all cases however it is preferred to use at least about 15–20% by weight of adjuvant from the standpoint of obtaining adequate mechanical stability of the pellets.

In the pressure copelleting of the zeolitic catalyst powder with powdered adjuvant, it is important that the pressure be low enough to leave a substantial volume of macro-pores having a diameter greater than about 20 A. Specifically, it is preferred that the final catalyst pellet comprise at least about 5% by volume of macro-pores in the 200–1,000 A. diameter range, as measured by the mercury prosimeter method described in Industrial and Engineering Chemistry, volume 41, page 780 (1949), or by the desorption isotherm method as described in the Journal of the American Chemical Society, volume 73, page 373 (1951). Porosity may also be specified more qualitatively in terms of the bulk density of the pelleted catalyst; bulk densities between about 0.5 and 1.0 gm./ml. of settled catalyst bed ordinarily indicate adequate porosity.

To achieve pellets of the desired porosity and at the same time obtain sufficient cohesion of the micro-particles to produce a pellet having adequate mechanical stability, it has been found that water content of the zeolite and the adjuvant are critical factors. The cohesive forces between the dry powder particles are so low that high compacting pressures are required, which tend to reduce the volume of macro-pores. However, if the moisture content of the zeolite (and preferably of the adjuvant material) is at least about 5%, and preferably at least 10% (as measured by weight loss on ignition at temperatures of about 1,100° F.), it is found that pellets of adequate mechanical strength and stability can be obtained at pelleting pressures low enough to give a catalyst in the bulk density range of about 0.5–1.0 gm./ml. and leave at least about 5% by volume of macro-pores in the 200–1,000 A. diameter range.

In cases where the initial zeolite catalyst component is substantially anhydrous and contains a substantial proportion of zeolitic hydrogen ions, care must be exercised in adjusting the moisture content thereof. In the case of these hydrogen zeolites, a substantial loss in crystallinity may result upon rapid hydration with liquid water. The desired water content is therefore achieved by hydrating at moderate temperatures of, e.g., 75° to 200° F. in the presence of water vapor at atmospheric pressure or below.

By far the preferred method of compounding the zeolite and adjuvant powders involves starting with an ammonium form of the zeolite, i.e., an ammonium precursor of the ultimately desired hydrogen zeolite. It has been found that by copelleting the hydrated ammonium zeolite with the adjuvant, and then calcining the pellets to convert the ammonium zeolite to the hydrogen zeolite, pellets of substantially greater mechanical stability are obtained as compared to copelleting the hydrogen zeolite directly with the adjuvant. Moreover, by using the ammonium zeolite, excess water of hydration has no damaging effect, and mixing can be conveniently carried out by slurrying the powders in an excess of water. Such a slurry, when reduced to the proper consistency can be employed to prepare extruded catalyst pellets, but preferably is partially dehydrated to a water content of, e.g., 15–50% by weight, ground, and pelleted in conventional pressure-pelleting dies.

The following examples are cited to illustrate the invention, but are not to be construed as limiting in scope:

Example I

A Pd-hydrogen-Y-molecular sieve catalyst was prepared by first converting a sodium Y-molecular sieve $$(SiO_2/Al_2O_3 \text{ mole-ratio}=4.9)$$

to the ammonium form by ion exchange (90% replacement of Na ions by $NH_4$ ions), followed by the addition of 0.5 weight-percent of Pd by ion exchange, then draining, drying and calcining at 600–900° F. The resulting catalyst, in the form of 3/16″ x 1/8″ pellets having a bulk density of 0.66 gm./ml., was then sulfided and tested for hydrocracking activity, using as feed an unconverted cycle oil boiling between 440–562° F., derived from a previous hydrofining-hydrocracking run. At 1,000 p.s.i.g., 2 LHSV, and 600° F., and with 10,000 s.c.f./b. of hydrogen, the conversion to 400° F. end-point gasoline was 61.5% volume-percent of the feed.

To compare the effect on activity of diluting the foregoing catalyst with an adjuvant, about 43 parts by weight thereof was ground to a 300-minus mesh powder (hydrated to about 25 weight-percent $H_2O$, and copelleted with 57 parts by weight of 100–325 mesh activated alumina, the final pellets being 1/8″ in diameter and having a bulk density of 0.80 gm./ml. Upon testing this catalyst under the same conditions (LHSV=2, based on bulk volume of finished catalyst), the conversion to 400° F. end-point gasoline was 81.4%, thus demonstrating that the use of a granular adjuvant gives even better results than the pure catalyst. It will be noted also that, on the basis of the active zeolite component, the 81.4% conversion obtained with the diluted catalyst was at a space velocity which is about twice that used with the undiluted catalyst, based on the active zeolite catalyst component.

Example II

An extruded catalyst composite was prepared by mixing 15 weight percent of a powdered, ion-exchanged hydrogen montmorillonite clay with 85 weight percent of a 0.5% Pd-Y molecular sieve hydrocracking catalyst wherein about 50% of the ion-exchange capacity was satisfied by hydrogen ions, and about 40% by magnesium ions (3.6 weight percent MgO). Sufficient water was added to form a stiff paste, and the mixture was then extruded through 1/8-inch dies, followed by drying and calcining of the extrudate. The calcined extrudate was then broken up into cylindrical pellets of about 1/8″ x 1/8″ size (0.6 gm./ml. bulk density) and tested for hydrocracking activity, using a hydrofined coker distillate gas oil as feed at 1,000 p.s.i.g., 1.5 LHSV and 8,000 s.c.f./b. of hydrogen. After 70 hours on-stream, the temperature required to maintain the predetermined 55 volume-percent conversion per pass to 400° F. end-point gasoline was about 556° F. This temperature is considerably lower than is required to maintain such a conversion level at 70 hours using 1/8″ pellets of the pure zeolite component alone, pelleted to a bulk density of 0.7 gm./ml.

Example III

A composite of 50 weight-percent precipitated, partially hydrated magnesia and 50 weight-percent of the hydrated Pd-hydrogen Y sieve catalyst of Example I (ground to 300-minus mesh), was copelleted in a tableting machine to form 1/8″ pellets of 0.90 gm./ml. bulk density. The resulting catalyst, after drying and calcining, was tested for hydrocracking activity, using as feed an unconverted, 750° F. end-point gas oil derived from a previous hydrofining-hydrocracking run. The test conditions were: 1,500 p.s.i.g., 1.0 LHSV, and 8,000 s.c.f./b. of hydrogen. After about 25 hours on-stream, the predetermined 43.7 volume-percent conversion per pass to 400° F. end-point gasoline was found to require a hydrocracking temperature of only about 525° F. This temperature is about 15° F. lower than was required to maintain an equivalent conversion using the same Pd-hydrogen Y-sieve catalyst copelleted to 0.81 bulk density with 50% by weight of activated alumina. Thus the magnesia-diluted catalyst is more active than the corresponding alumina-diluted catalyst, which in turn is more active than the original undiluted catalyst of Example I.

Example IV

This example illustrates the desirable combination of pellet strength and catalyst activity resulting from the copelleting of alumina hydrate with the partially hydrated ammonium zeolite catalyst. The initial zeolite catalyst component was a 0.5% Pd-ammonium Y-sieve zeolite which had been partially back-exchanged with magnesium (to give 3.5 weight percent MgO) and dried to a water content of about 20 weight percent. Several lots of this catalyst component were mixed with varying proportions of spray-dried alumina trihydrate containing 5 weight-percent of coprecipitated silica gel. In some cases the alumina-silica gel was impregnated with 0.2–0.5% by weight of palladium. The powdered mixtures were then compressed into 1/8″ pellets, dried and calcined (to convert the ammonium zeolite to the hydrogen form) and tested for activity and mechanical stability.

Activity was measured in terms of temperature required to give 55 volume-percent conversion to 400° F. end-point gasoline after 90 hours on-stream at 1,000 p.s.i.g., 1.5 LHSV and 8,000 s.c.f./b. of hydrogen, using a gas oil feed very similar to that employed in Example III.

Pellet strength and stability was measured (before use in the activity test) by rehydrating the pellets, then determining the average crushing strength and comparing with the original crushing strength of the pellets. In addition, determinations were made on the weight percent of pellets which were broken or shattered during the activity test runs. The results were as follows:

TABLE 1

| Catalyst No. | 1 | 2 | 3 | 4 | 5 | 6 |
| --- | --- | --- | --- | --- | --- | --- |
| Composition, Wt. percent: | | | | | | |
| $Al_2O_3$(5% $SiO_2$) | 0.0 | 20 | 25 | 30 | 50 | 50 |
| Percent Pd on $Al_2O_3$ | 0.0 | 0.3 | 0.0 | 0.5 | 0.2 | 0.0 |
| 0.5% Pd-zeolite | 100 | 80 | 75 | 70 | 50 | 50 |
| Bulk Density, gms./ml. | 0.62 | 0.73 | 0.75 | 0.72 | 0.73 | 0.76 |
| Activity, ° F. for 55% conversion | 542 | 541 | 539 | 528 | 559 | 579 |
| Crushing Strength, lbs.: | | | | | | |
| Before calcining | 11.5 | 15.4 | 15.9 | 19.3 | 13.2 | 13.3 |
| After calcining | 21.3 | 35.1 | 32.0 | 33.1 | 27.3 | 27.4 |
| After rehydration | a (9.6) | 16.4 | 20.7 | 20.9 | 17.8 | 16.9 |
| Wt. Percent Broken Pellets After Activity Test | 2.3 | | | <0.3 | 0.0 | <0.3 | a Estimated on basis of 45% strength retention found for similar catalysts after full hydration.

The superior mechanical stability of the alumina-containing catalysts is readily apparent. Pellets of intermediate mechanical stability are obtained when the zeolite is copelleted while in the hydrogen form. Though the activities on a bulk volume basis are in some cases slightly lower than that of the undiluted catalyst, they are all superior, based on data obtained in other runs, to the activity of the undiluted catalyst when compressed into pellets of 0.7 bulk density.

*Example V*

The data in Example IV may seen to indicate that rehydration of the calcined pellets brings about a loss in crushing strength. This is true when the hydrated pellets are compared directly with the calcined pellets. However, recalcining of the rehydrated pellets brings about a recovery of the strength lost on hydration, and in cases where at least about 20% of $Al_2O_3$ is present, the strength of the recalcined pellets is actually superior to that of the once-calcined pellets. This is demonstrated by the following data obtained on another series of catalysts prepared as described in Example IV:

TABLE 2

| Catalyst No. | 7 | 8 | 9 | 10 | 11 | 12 | 13 |
|---|---|---|---|---|---|---|---|
| Composition, Wt. Percent: | | | | | | | |
| $Al_2O_3$ (5% $SiO_2$) | 0 | 0 | 10 | 15 | 20 | 20 | 25 |
| Percent Pd on $Al_2O_3$ | | | 1.0 | 1.0 | 1.0 | 0.5 | 0.3 |
| 0.5% Pd-Zeolite | 100 | 100 | 90 | 85 | 80 | 80 | 75 |
| Bulk Density, gms./ml | 0.70 | 0.60 | 0.62 | 0.62 | 0.67 | 0.69 | 0.67 |
| Crushing Strength, lbs: | | | | | | | |
| After calcination (920° F.) | 25.6 | 17.7 | 18.0 | 15.9 | 19.7 | 29.5 | 31.8 |
| After Full Hydration (adsorption from air) | 11.5 | 7.3 | | | 7.5 | 10.6 | 10.0 |
| After recalcination of Hydrated Pellets | 20.9 | 12.9 | 15.8 | 14.6 | 19.9 | 41.6 | 38.0 |
| Percent Cracked After Hydration-Recalcination | | 25 | 0 | 0 | 0 | 0 | 0 |

*Example VI*

This example demonstrates the superior mechanical stability of the catalysts copelleted with silica-stabilized alumina, vs. alumina alone.

Two batches of catalyst were prepared from the same lot of a 0.5% Pd-Mg-$NH_4$ zeolite of the Y crystal type, wherein about 50% of the ion-exchange capacity was satisfied by ammonium ions and 40% by magnesium ions. The procedure in both cases consisted in slurrying 80 parts by dry weight of the powdered zeolite catalyst with 20 parts of the powdered adjuvant in an excess of water at a pH of about 7.9–8.2, followed by draining of the mixture, drying to a water content of about 20% by weight, pelleting of the partially dehydrated mixture, and finally calcining a about 900° F. to convert the ammonium zeolite to the hydrogen form. In the case of Catalyst A, the adjuvant was pure precipitated alumina trihydrate gel, and in the case of Catalyst B was a coprecipitated, 5% $SiO_2$–95% $Al_2O_3$ trihydrate.

The resulting catalyst pellets were tested for mechanical stability by a standard test involving calcining for 2 hours at 600° C. in stagnant air, cooling in a desiccator, immersing in liquid water, and drying in ambient air for 16 hours. The pellets were then examined for physical damage with the following results:

| Catalyst No | A | B |
|---|---|---|
| Adjuvant | (1) | (2) |
| Percent of pellets undamaged | 0 | 96 |
| Percent lightly cracked | 12 | 4 |
| Percent heavily cracked | 88 | 0 |

[1] $Al_2O_3$.
[2] 5% $SiO_2$–95% $Al_2O_3$.

It is clearly evident that the $Al_2O_3$–$SiO_2$ adjuvant is much more effective than $Al_2O_3$ alone. (The $Al_2O_3$-bonded Catalyst A is however superior to the pure zeolite catalyst in mechanical strength; the stability test employed is much more severe than conditions which would be encountered in normal use of the catalysts.)

Results analogous to those indicated in the foregoing examples are obtained when other adjuvants described herein are substituted for those in the examples. It is hence not intended to limit the invention to the details of the examples, but only broadly as defined in the following claims.

I claim:
1. A catalyst composition comprising a cohesive, copelleted mixture of (A) between about 20% and 90% by weight of a Group VIII metal-promoted crystalline alumino-silicate molecular sieve zeolite having a $SiO_2/Al_2O_3$ mole ratio between about 3 and 10, and wherein at least about 20% of the zeolitic ion-exchange capacity thereof is satisfied by hydrogen ions, and (B) between about 10% and 80% by weight of powdered magnesia; said composition comprising at least about 5% by volume of macro pores in the 200–1,000 A. diameter range, and having a bulk density between about 0.5 and 1.0 gram/ml. of settled bulk volume.

2. A catalyst composition comprising a cohesive, copelleted mixture of (A) between about 20% and 90% by weight of a Group VIII metal-promoted crystalline alumino-silicate molecular sieve zeolite having a $SiO_2/Al_2O_3$ mole ratio between about 3 and 10, and wherein at least about 20% of the zeolitic ion-exchange capacity thereof is satisfied by hydrogen ions, and (B) between about 10% and 80% by weight of powdered magnesia; said composition at least about 5% by volume of macro pores in the 200–1,000 A. diameter range, and having a bulk density between about 0.5 and 1.0 gram/ml. of settled bulk volume, the relative proportions of said components (A) and (B) being further adjusted within the stated ranges, and correlated with the zeolitic hydrogen ion content of said component (A), to give a final composition having a hydrocracking activity at least substantially equal, on a bulk-volume basis, to the activity of said component (A) alone when copelleted to the same size and to a bulk density of 0.7 gram/ml.

References Cited

UNITED STATES PATENTS

| | | | |
|---|---|---|---|
| 2,865,867 | 12/1958 | Van Dyke et al. | 252—455 |
| 2,882,244 | 4/1959 | Milton | 252—455 |
| 2,962,435 | 11/1960 | Fleck et al. | 252—455 X |
| 2,971,904 | 2/1961 | Gladrow et al. | 252—455 X |
| 2,973,327 | 2/1961 | Mitchell et al. | 252—449 |
| 2,983,670 | 5/1961 | Seubold | 252—455 X |
| 3,130,006 | 4/1964 | Rabo et al. | 252—455 X |
| 3,130,007 | 4/1964 | Breck | 252—455 X |
| 3,140,249 | 7/1964 | Plank et al. | 252—455 X |

OTHER REFERENCES

Emmett: "Catalysis," vol. I, copyright 1954 by Reinhold Publishing Corp., pages 245–246.

Mellor: "Comprehensive Treatise on Inorganic and Theoretical Chemistry," vol. 6, 1925, page 575.

OSCAR R. VERTIZ, *Primary Examiner.*

MAURICE A. BRINDISI, BENJAMIN HENKIN, *Examiners.*

E. J. MEROS, *Assistant Examiner.*